United States Patent
Hwang et al.

(10) Patent No.: US 7,553,050 B2
(45) Date of Patent: Jun. 30, 2009

(54) OPTICAL SHEET, BACKLIGHT ASSEMBLY AND DISPLAY DEVICE HAVING THE SAME

(75) Inventors: Seong-Yong Hwang, Seongnam-si (KR); In-Sun Hwang, Suwon-si (KR); Sung-Kyu Shim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 11 days.

(21) Appl. No.: 11/688,933

(22) Filed: Mar. 21, 2007

(65) Prior Publication Data

US 2007/0223232 A1     Sep. 27, 2007

(30) Foreign Application Priority Data

Mar. 21, 2006   (KR)   ...................... 10-2006-0025520

(51) Int. Cl.
*F21V 5/00* (2006.01)
(52) U.S. Cl. ...................... 362/330; 362/620; 362/622; 362/606; 359/599
(58) Field of Classification Search ........................ None
See application file for complete search history.

(56) References Cited

U.S. PATENT DOCUMENTS

| | | | | |
|---|---|---|---|---|
| 4,917,465 | A | * | 4/1990 | Conner et al. ................... 349/5 |
| 5,396,406 | A | * | 3/1995 | Ketchpel ....................... 362/27 |
| 5,592,332 | A | * | 1/1997 | Nishio et al. ................. 359/619 |
| 5,600,455 | A | | 2/1997 | Ishikawa et al. |
| 6,527,410 | B2 | * | 3/2003 | Yamaguchi .................. 362/243 |
| 6,752,505 | B2 | * | 6/2004 | Parker et al. ................. 362/627 |
| 7,081,933 | B2 | * | 7/2006 | Yu et al. ........................ 349/62 |
| 7,158,298 | B2 | * | 1/2007 | Miyata et al. ................ 359/457 |
| 2004/0207918 | A1 | * | 10/2004 | Abe et al. ..................... 359/457 |
| 2006/0256582 | A1 | * | 11/2006 | Chuang ....................... 362/620 |

* cited by examiner

*Primary Examiner*—Sandra L O'Shea
*Assistant Examiner*—Danielle Allen
(74) *Attorney, Agent, or Firm*—Cantor Colburn LLP

(57) ABSTRACT

An optical sheet includes a base film and a light-concentrating member. The light-concentrating member includes light-concentrating protrusions and is disposed on the base film. Each of the light-concentrating protrusions includes first to fourth surfaces. The first and second surfaces are extended from the upper surface along an exterior surface of a first and second cylinder in a clockwise and a counterclockwise direction, respectively. The first and second cylinders have first and second axes that are substantially parallel to each other. The third and fourth surfaces are extended from the upper surface along an exterior surface of a third cylinder in clockwise and counterclockwise directions, respectively. The third axis is substantially perpendicular to the first central axis.

16 Claims, 9 Drawing Sheets

OPTICAL SHEET, BACKLIGHT ASSEMBLY AND DISPLAY DEVICE HAVING THE SAME

This application claims priority to Korean Patent Application No. 2006-25520 filed on Mar. 21, 2006, and all the benefits accruing therefrom under 35 U.S.C. §119, the contents of which are herein incorporated by reference in its entirety.

BACKGROUND OF THE INVENTION

1. Field of the Invention

The present invention relates to an optical sheet, a backlight assembly having the optical sheet and a liquid crystal display apparatus having the optical sheet. More particularly, the present invention relates to an optical sheet having different light-concentrating efficiencies according to direction, a backlight assembly having the optical sheet and a display device having the optical sheet.

2. Description of the Related Art

An optical sheet is applied to a liquid crystal display ("LCD") apparatus in order to enhance optical properties, such as brightness, front-view brightness, etc., of light supplied to a display panel. The optical sheet has a structure having an ultraviolet-curing resin laminated on a base film including polyester. The base film has at least one adhesive surface.

A prism sheet, which is a type of optical sheet, concentrates light in a perpendicular direction and enhances front-view brightness. A prism sheet shown in FIG. 10 of U.S. Pat. No. 5,600,455 includes a plurality of prisms. Each of the prisms is extended in one direction and has an isosceles triangular-shaped cross-section. Therefore, the prism sheet can concentrate light of which the direction is in a first imaginary plane that is substantially perpendicular to a longitudinal direction of the prisms, but the prism sheet cannot concentrate light of which the direction is in a second imaginary plane that is substantially parallel to the longitudinal direction of the prisms.

Therefore, a conventional display apparatus employs two prism sheets. The two prism sheets of the conventional display apparatus are arranged such that a longitudinal direction of the prisms of a first prism sheet is substantially perpendicular to that of a second prism sheet. However, the display apparatus having two prism sheets is disadvantageous with respect to the cost and size of the display apparatus.

In order to solve the above-mentioned problem, an optical sheet capable of concentrating light in both directions perpendicular to each other in the plane of the optical sheet has been developed. The optical sheet includes a plurality of light-concentrating protrusions, each of which has a pyramid shape. However, the optical sheet has a constant light-concentrating efficiency according to the directions substantially perpendicular to each other in the plane of the optical sheet. Also, a display device employing two stacked prism sheets having the protrusions, each of which has a pyramid shape, displays a moiré pattern.

BRIEF SUMMARY OF THE INVENTION

An exemplary embodiment provides an optical sheet having a predetermined light-concentrating efficiency according to direction.

An exemplary embodiment further provides a backlight assembly having the optical sheet.

An exemplary embodiment provides a liquid crystal display apparatus ("LCD") having the optical sheet.

An exemplary embodiment of an optical sheet includes a base film and a light-concentrating member. The light-concentrating member includes a plurality of light-concentrating protrusions. Each of the light-concentrating protrusions is protruded from an upper surface of the base film. Each of the light-concentrating protrusions includes a first surface, a second surface, a third surface and a fourth surface. The first surface is extended from the upper surface along an exterior surface of a first cylinder in a clockwise direction. The first cylinder has a first central axis that is a central line of the first cylinder on the upper surface. The second surface opposite to the first surface is extended from the upper surface along an exterior surface of a second cylinder in a counterclockwise direction. The second cylinder has a second axis which is a central line of the second cylinder on the upper surface. The second axis is substantially parallel to the first axis. The third surface is extended from the upper surface along an exterior surface of a third cylinder in a clockwise direction. The third cylinder has a third central axis that is a central line of the third cylinder on the upper surface. The third axis is substantially perpendicular to the first and second central axes. The third surface connects the first surface with the second surface. The fourth surface opposite to the third surface is extended from the upper surface along the exterior surface of the third cylinder in a counterclockwise direction. The fourth surface connects the first surface with the second surface.

In an exemplary embodiment, the third and fourth surfaces, respectively, include an upper edge substantially parallel to the first and second central axes, a lower edge substantially parallel to the upper edge, the lower edge being disposed under the upper edge, and two slope edges connecting the upper edge with the lower edge when they are seen along the third central axis. The first, second, third, and fourth surfaces respectively have a triangular shape when they are seen along a normal line of the upper surface.

In an exemplary embodiment, the second surface facing the first surface may be extended from the upper surface along the exterior surface of the first cylinder in the counterclockwise direction. In this case, the first, second, third, and fourth surfaces respectively have a triangular shape when they are seen along a normal line of the upper surface. The light-concentrating member includes a plurality of light-concentrating protrusions repeatedly formed in a first direction substantially parallel to the first central axis and a second direction substantially parallel to the third central axis.

An exemplary embodiment of a backlight assembly includes a light source to generate light, a first optical sheet and a second optical sheet. The first optical sheet includes a first base film disposed above the light source and a first light-concentrating member having a plurality of first light-concentrating protrusions formed on a first upper surface of the first base film. Each of the first light-concentrating protrusions on the first upper surface has a width of a first pitch. The second optical sheet includes a second base film disposed above the first optical sheet and a second light-concentrating member having a plurality of second light-concentrating protrusions formed on a second upper surface of the second base film. Each of the second light-concentrating protrusions has a width of a second pitch that is smaller than the first pitch.

In an exemplary embodiment, each of the first light-concentrating protrusions includes a first surface, a second surface, a third surface, and a fourth surface. The first surface is extended from the first upper surface along an exterior surface of a first cylinder in a clockwise direction. The first cylinder has a first central axis that is a central line of the first cylinder on the first upper surface. The second surface opposite to the first surface is extended from the first upper surface along the exterior surface of the first cylinder in a counterclockwise direction. The third surface connects the first surface with the second surface and is extended from the first upper surface along an exterior surface of a second cylinder in a clockwise direction. The second cylinder has a second central axis that is a central line of the second cylinder on the first upper surface. The second central axis is substantially perpendicular to the first central axis. The fourth surface opposite to the third surface is extended from the first upper surface along the exterior surface of the second cylinder in a counterclockwise direction. The fourth surface connects the first surface with the second surface.

In an exemplary embodiment, each of the second light-concentrating protrusions includes a fifth surface, a sixth surface, a seventh surface, and a eighth surface. The fifth surface is extended from the second upper surface along an exterior surface of a third cylinder in a clockwise direction. The third cylinder has a third central axis that is a central line of the third cylinder on the second upper surface. The sixth surface opposite to the fifth surface is extended from the second upper surface along the exterior surface of the third cylinder in a counterclockwise direction. The seventh surface connects the fifth surface with the sixth surface and is extended from the second upper surface along an exterior surface of a fourth cylinder in a clockwise direction. The fourth cylinder has a fourth central axis that is a central line of the fourth cylinder on the second upper surface. The fourth central axis is substantially perpendicular to the third central axis. The eighth surface opposite to the seventh surface is extended from the second upper surface along the exterior surface of the fourth cylinder in a counterclockwise direction. The eighth surface connects the fifth surface with the sixth surface.

In an exemplary embodiment, the first pitch is defined by an interval between the first surface and the second surface on the first upper surface, and the second pitch is defined by an interval between the fifth surface and the sixth surface on the second upper surface. The first pitch is about 1.5 to about 6 times larger than the second pitch. The third pitch is defined by an interval between the third surface and the fourth surface on the first upper surface. The fourth pitch is defined by an interval between the seventh surface and the eighth surface on the second upper surface. The third pitch is about 1.5 to about 6 times larger than the fourth pitch.

An exemplary embodiment of a display apparatus includes a light source to generate light, a first optical sheet, a second optical sheet and a display panel. The first optical sheet includes a first base film disposed above the light source and a first light-concentrating member having a plurality of first light-concentrating protrusions formed on a first upper surface of the first base film. Each of the first light-concentrating protrusions has a width of a first pitch. The second optical sheet includes a second base film disposed above the first optical sheet and a second light-concentrating member having a plurality of second light-concentrating protrusions formed on a second upper surface of the second base film. Each of the second light-concentrating protrusions has a width of a second pitch that is smaller than the first pitch. The display panel is disposed above the second optical sheet. The display panel displays an image by using the light generated by the light source, the light passing through the first and second optical sheets.

In an exemplary embodiment, a pitch of a pixel formed on the display panel is larger than both the first pitch and the second pitch or smaller than both the first pitch and the second pitch. The display apparatus further includes a diffusion sheet diffusing the light generated by the light source. The diffusion sheet is disposed between the light source and the first optical sheet.

In exemplary embodiments of the optical sheet, the backlight assembly and the display apparatus, light-concentrating efficiency and display quality may be enhanced.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
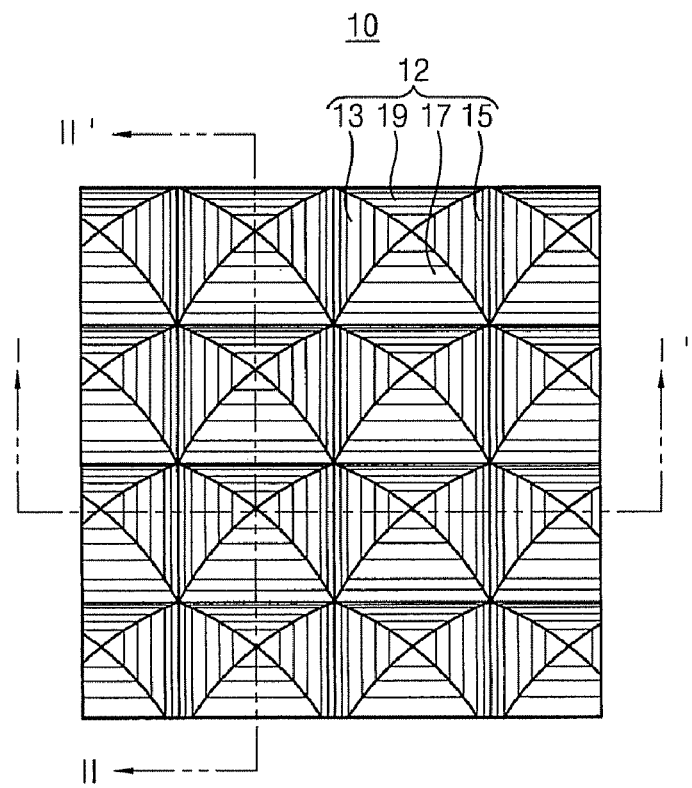
FIG. 1 is a perspective view illustrating an exemplary embodiment of an optical sheet according to the present invention.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

It will be understood that when an element or layer is referred to as being "on" another element or layer, it can be directly on to the other element or layer or intervening elements or layers may be present. In contrast, when an element is referred to as being "directly on" another element or layer, there are no intervening elements or layers present. Like reference numerals refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the present invention are described herein with reference to cross-sectional illustrations that are schematic illustrations of idealized embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a perspective view illustrating an exemplary embodiment of an optical sheet according to the present invention.

Referring to FIG. 1, an optical sheet 10 may include a polymer resin having properties of high transmissivity, high thermal resistance, low reactivity, high intensity, etc. The polymer resin may include, but is not limited to, polymethyl methacrylate, polyamide, polyimide, polypropylene, polyurethane, etc.

The optical sheet 10 includes a base film 11 (See FIG. 2) and a plurality of light-concentrating protrusions 12. In exemplary embodiments, the light-concentrating protrusions 12 may be formed on the base film 11 through an ultraviolet ("UV") molding method, a hot embossing process, etc.

Figure 2:
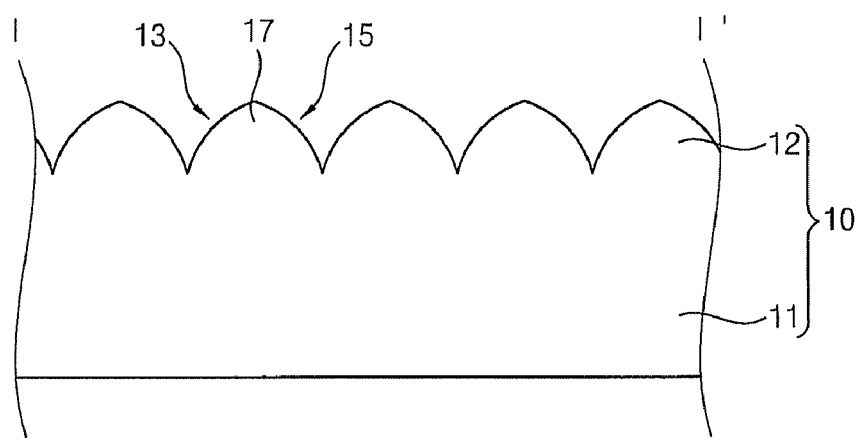
FIG. 2 is a cross-sectional view taken along line I-I' in FIG. 1.
Figure 3:
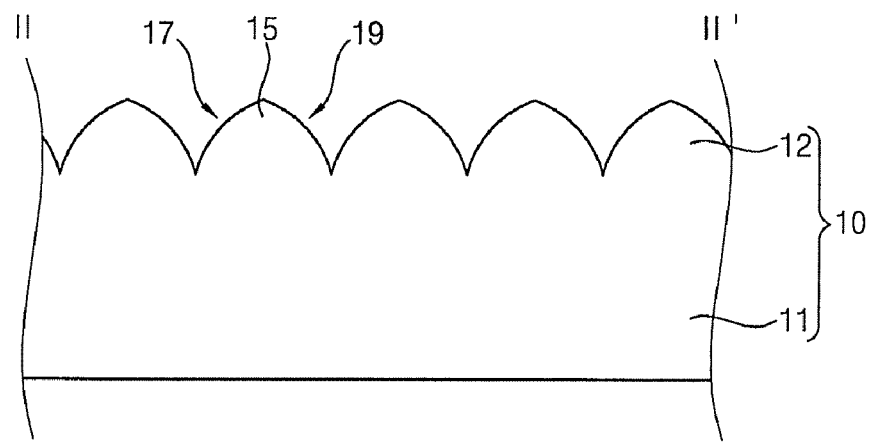
FIG. 3 is a cross-sectional view taken along line II-II' in FIG. 1.

FIG. 2 is a cross-sectional view taken along line I-I' in FIG. 1. FIG. 3 is a cross-sectional view taken along line II-II' in FIG. 1.

Referring to FIGS. 1 to 3, the light-concentrating protrusions 12 are protruded from an upper surface of the base film 11. Each of the light-concentrating protrusions 12 is repeatedly formed along a first direction and a second direction substantially perpendicular to the first direction of the base film 11. Each of the light-concentrating protrusions 12 includes first, second, third, and fourth surfaces 13, 15, 17 and 19, respectively. The first and second surfaces 13 and 15 are formed along the first direction. The second surface 15 is opposite to the first surface 13. The third and fourth surfaces 17 and 19 are formed along the second direction. The fourth surface 19 is opposite to the third surface 17.

The first, second, third, and fourth surfaces 13, 15, 17 and 19, respectively, have a curvature substantially corresponding to an exterior surface of a cylinder. As in the illustrated embodiment of FIG. 2, the first surface 13 is extended from the upper surface of the base film 11 along an exterior surface of a first cylinder in a clockwise direction. The first cylinder has a first central axis substantially parallel to the second direction, which is a central line of the first cylinder on the upper surface. The second surface 15 opposite to the first surface 13 is extended from the upper surface along the exterior surface of the first cylinder in a counterclockwise direction.

Referring to FIG. 3, the third surface 17, which connects the first surface 13 with the second surface 15, is extended from the upper surface along an exterior surface of a second cylinder in a clockwise direction. The second cylinder has a second central axis, which is a central line of the second cylinder on the upper surface. The second central axis is substantially parallel to the first direction. The fourth surface 19 opposite to the third surface 17 is extended from the upper surface along the exterior surface of the second cylinder in a counterclockwise direction. The fourth surface 19 connects the first surface 13 with the second surface 15.

The first, second, third, and fourth surfaces 13, 15, 17 and 19 may be connected to each other at a center point of each of the light-concentrating protrusions 12 as illustrated in FIG. 1. Therefore, the first to fourth surfaces 13, 15, 17, and 19, respectively, have a substantially triangular shape when they are seen along a normal line of the upper surface of the base film 11 (or when they are seen on a plane that is substantially parallel with the upper surface of the base film 11 as in FIG. 1).

In the illustrated embodiment, each of the light-concentrating protrusions 12 has a substantially symmetric shape along the first direction and the second direction. Therefore, the light-concentrating efficiency of the optical sheet 10 according to the first direction is substantially similar to the light-concentrating efficiency of the optical sheet 10 according to the second direction.

Figure 4A:
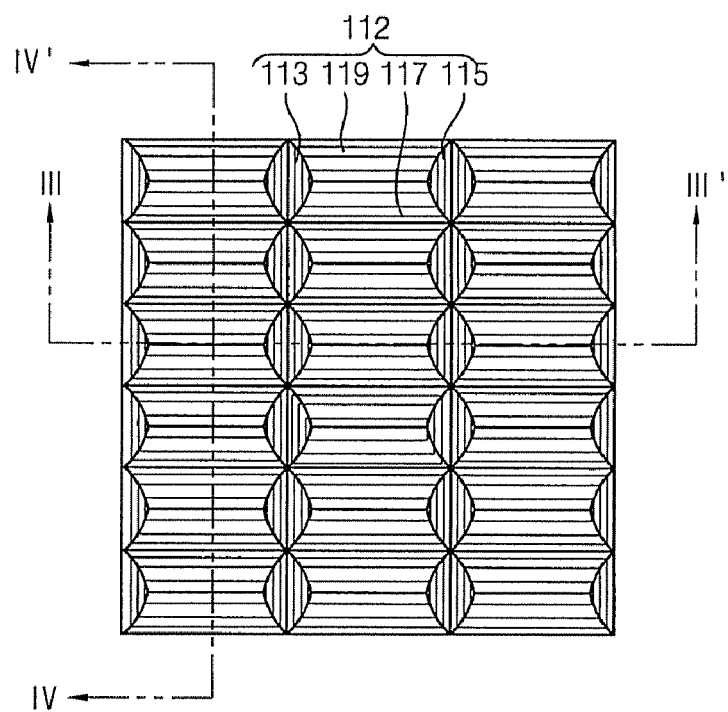
FIG. 4A is a plan view illustrating another exemplary embodiment of an optical sheet according to the present invention.
Figure 4B:
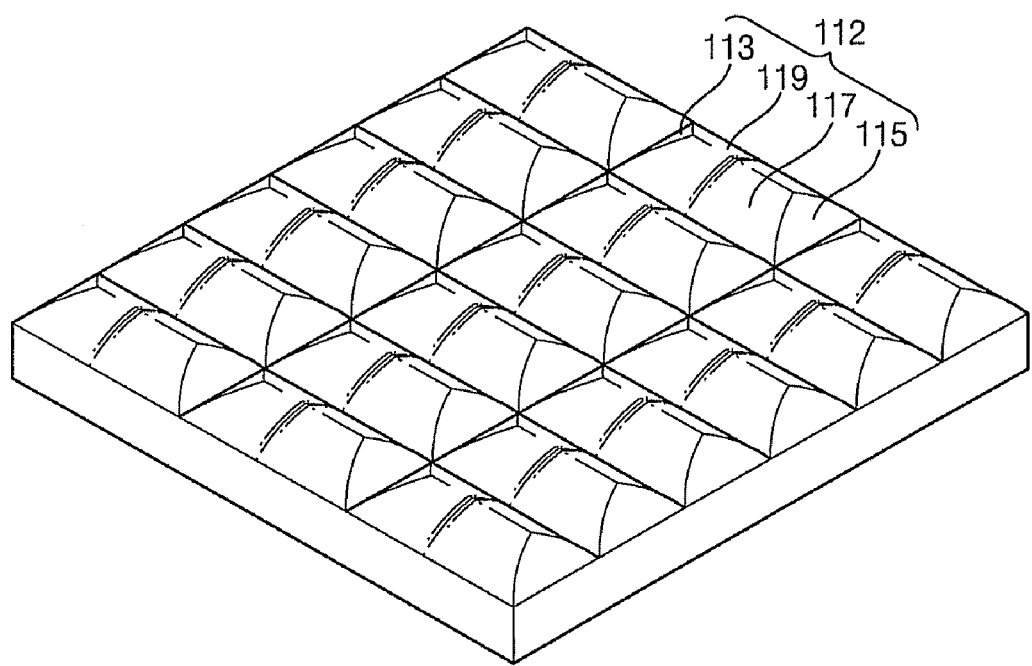
FIG. 4B is a perspective view illustrating the optical sheet in FIG. 4A.
Figure 5:
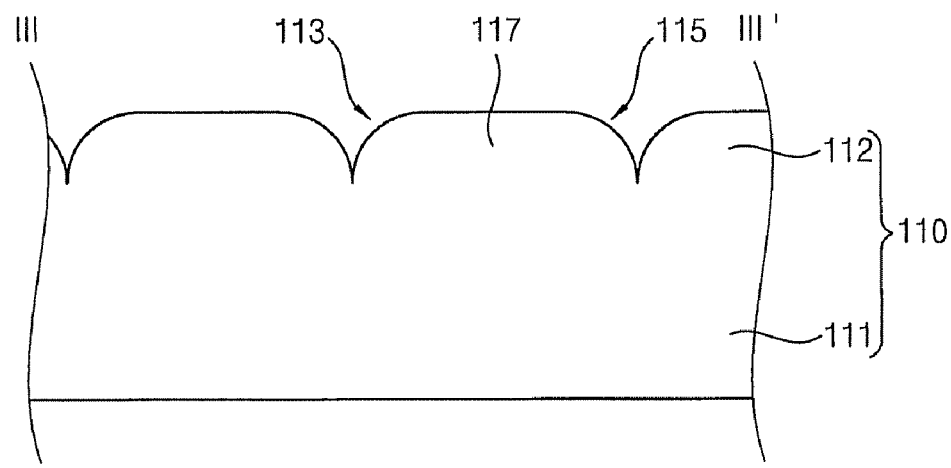
FIG. 5 is a cross-sectional view taken along line III-III' in FIG. 4A.
Figure 6:
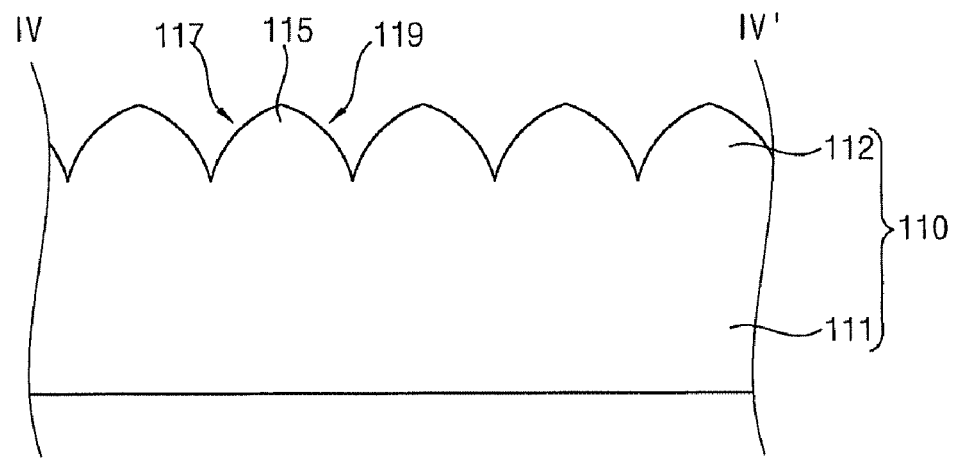
FIG. 6 is a cross-sectional view taken along line IV-IV' in FIG. 4A.

FIG. 4A is a plan view illustrating another exemplary embodiment of an optical sheet according to the present invention, and FIG. 4B is a perspective view of the optical sheet of FIG. 4A. FIG. 5 is a cross-sectional view taken along line III-III' in FIG. 4A. FIG. 6 is a cross-sectional view taken along line IV-IV' in FIG. 4A.

Referring to FIGS. 4A, 4B to 6, an optical sheet 110 includes a base film 111 and a plurality of light-concentrating protrusions 112 formed on an upper surface of the base film 111. The optical sheet 110 is substantially the same as the optical sheet 10 shown in FIGS. 1 to 3 except for a shape of each of the light-concentrating protrusions 112.

The light-concentrating protrusions 112 are repeatedly formed on the upper surface along the first direction and the second direction. Each of the light-concentrating protrusions 112 includes first, second, third, and fourth surfaces 113, 115, 117 and 119, respectively.

The first surface 113 is extended from the upper surface of the base film 111 along an exterior surface of a first cylinder in a clockwise direction. The first cylinder has a first central axis substantially parallel to the second direction, which is a central line of the first cylinder on the upper surface. The second surface 115 opposite to the first surface 113 is extended from the upper surface of the base film 111 along an exterior surface of a second cylinder in a counterclockwise direction. The second cylinder has a second axis, which is a central line of the second cylinder on the upper surface, substantially parallel to the second direction. The first and second surfaces 113 and 115 are spaced apart from each other along the first direction.

The third surface 117 is extended from the upper surface of the base film 111 along the exterior surface of a third cylinder in a clockwise direction. The third surface 117 connects the first surface 113 with the second surface 115. The fourth surface 119 opposite to the third surface 117 is extended from the upper surface of the base film 111 along the exterior surface of the third cylinder in a counterclockwise direction. The fourth surface 119 connects the first surface 113 with the second surface 115. The third surface 117 contacts with the fourth surface 119 at a center point of each of the light-concentrating protrusion.

As shown in FIG. 6, the first and second surfaces 113 and 115, respectively, have a substantially semicircular shape when they are seen in a direction substantially parallel to the second central axis. As shown in FIG. 5, the third and fourth surfaces 117 and 119 respectively have a substantially trapezoidal shape when they are seen in a direction substantially parallel to the first central axis. The third and fourth surfaces 117 and 119, respectively, include an upper edge disposed on (e.g., above) the upper surface of the base film 111, a lower edge disposed under the upper edge (e.g., coinciding with the upper surface of the base film 111), which is substantially parallel to the upper edge and two slope edges (e.g., a profile of the first and second surfaces 113 and 115) connecting the upper edge with the lower edge.

As illustrated in the exemplary embodiment, each area of the third and fourth surfaces 117 and 119 disposed along the second central axis is larger than each area of the first and second surfaces 113 and 115 disposed along the first central axis. The light-concentrating efficiency of the optical sheet 110 corresponding to a direction substantially parallel to the second central axis is larger than the light-concentrating efficiency of the optical sheet 110 corresponding to a direction substantially parallel to the first central axis.

Figure 7:
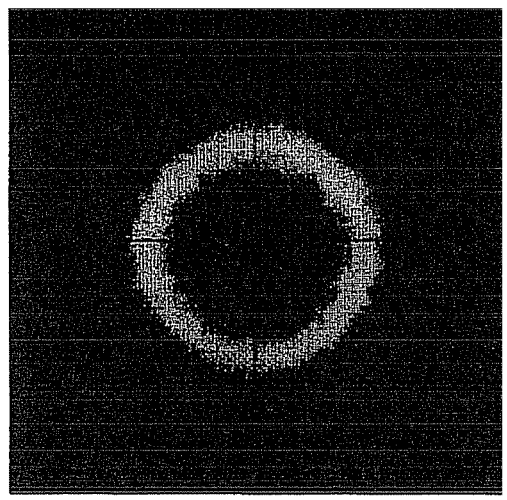
FIGS. 7 and 8 are views showing light-concentrating efficiency when the optical sheet shown in FIG. 1 is applied.
Figure 8:
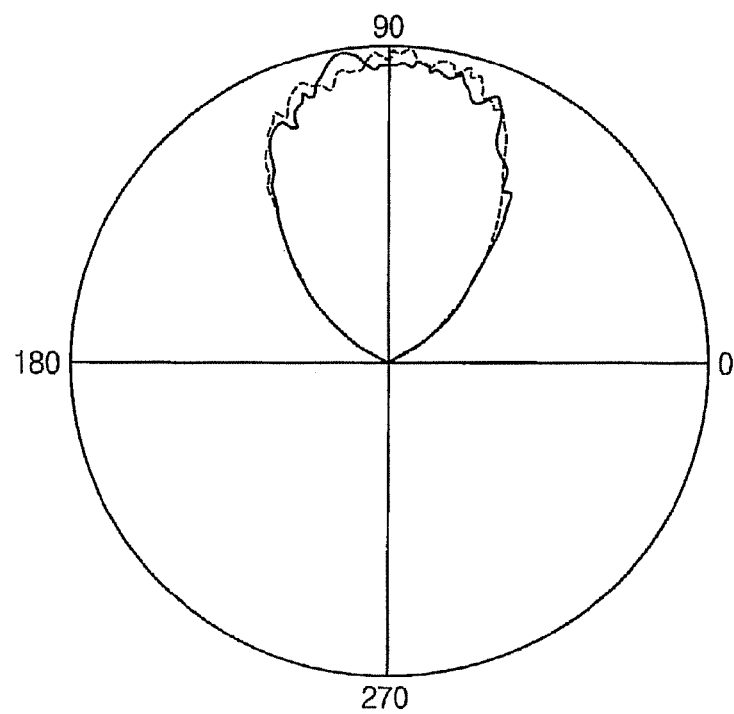

FIGS. 7 and 8 are views showing light-concentrating efficiency when the optical sheet shown in FIG. 1 is applied to a liquid crystal display ("LCD") apparatus. FIG. 7 shows a brightness of light emitted from the optical sheet 10 shown in FIG. 1. FIG. 8 is a graph showing a viewing angle of the optical sheet 10. A normal line direction of the optical sheet 10 is a direction of 90 degrees in FIG. 8. In FIG. 8, a solid line of the graph shows a viewing angle relating to a row direction and a dotted line shows a viewing angle relating to a column direction.

Figure 9:
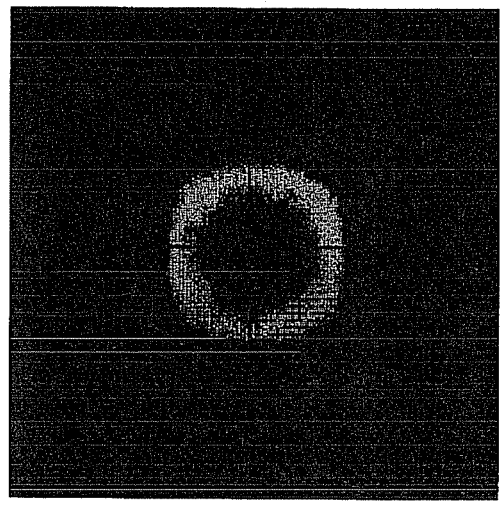
FIGS. 9 and 10 are views showing light-concentrating efficiency when two of the optical sheets shown in FIG. 1 are applied.
Figure 10:
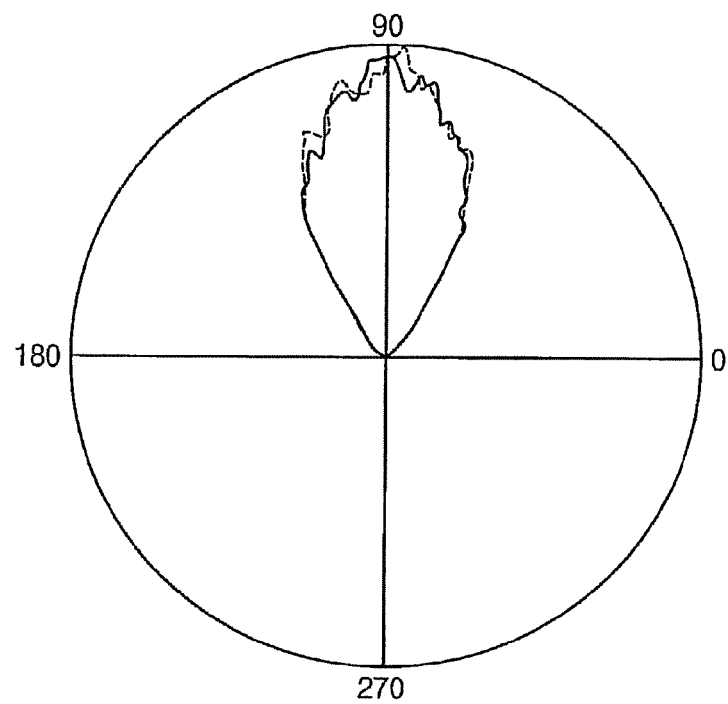

Referring to FIGS. 7 and 8, the viewing angle of the optical sheet 10 is in a range of about −41 degrees to +41 degrees. A viewing angle of a conventional sheet is in a range of about −35 degrees to about +35 degrees when two conventional prism sheets are disposed on a conventional diffusion sheet, such that longitudinal directions of the prisms of the two conventional prism sheets are substantially perpendicular to each other. The conventional prism sheet has prisms respectively having a triangular cross-section, the prisms being respectively extended in one direction. Advantageously, the light-concentrating efficiency of one optical sheet of the illustrated embodiment is improved over the two conventional prism sheets disposed on the conventional diffusion sheet FIGS. 9 and 10 are views showing light-concentrating efficiency when two optical sheets shown in FIG. 1 are applied to an LCD apparatus. A normal line direction of the optical sheet 10 is a direction of 90 degrees in FIG. 10. In FIG. 10, a solid line of the graph shows a viewing angle relating to a row direction, and a dotted line shows a viewing angle relating to a column direction.

Referring to FIGS. 9 and 10, the viewing angle is in a range of about −31 degrees to about +31 degrees. As illustrated, the light-concentrating efficiency of the two optical sheets of the illustrated embodiment is superior to the two conventional prism sheets disposed on the diffusion sheet.

Advantageously, the combination of two conventional prism sheets and the diffusion sheet may be replaced by the combination of the two optical sheets 10 of the illustrated embodiment for a backlight assembly used in a display apparatus.

Figure 11:
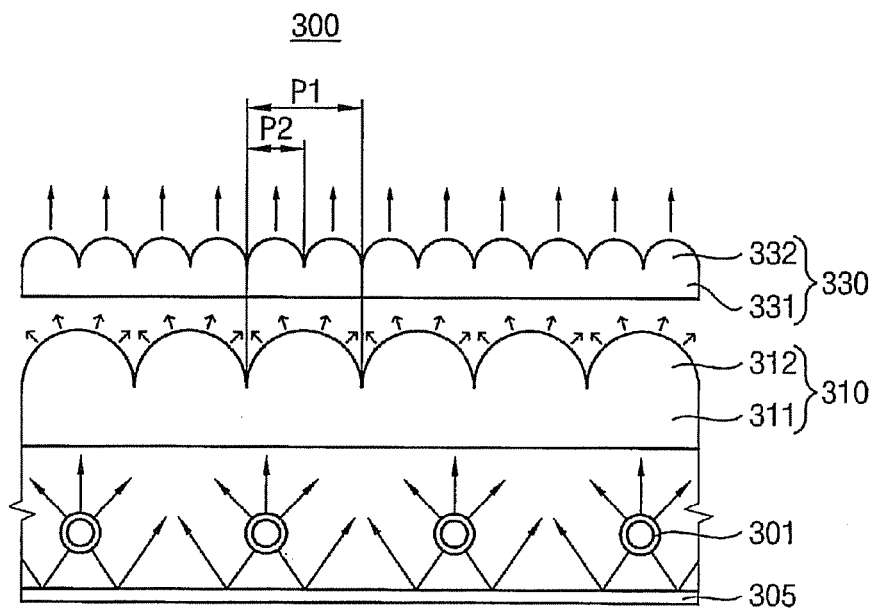
FIG. 11 is a cross-sectional view illustrating an exemplary embodiment of a backlight assembly according to the present invention.

FIG. 11 is a cross-sectional view illustrating an exemplary embodiment of a backlight assembly according to the present invention.

Referring to FIG. 11, the backlight assembly 300 includes a light source 301, a first optical sheet 310 and a second optical sheet 330.

In exemplary embodiments, the light source 301 may include a light-emitting diode ("LED") or a cold cathode fluorescent lamp ("CCFL"). The backlight assembly 300 includes a plurality of light sources 301.

The first optical sheet 310 is disposed above the light source 301 and concentrates light generated by the light source 301. The first optical sheet 310 includes a first base film 311 and a plurality of first light-concentrating protrusions 312. The first optical sheet 310 is substantially identical to the optical sheet 10 shown in FIGS. 1 to 3.

Each of the first light-concentrating protrusions 312 is protruded from a first upper surface of the first base film 311. The first light-concentrating protrusions 312 are repeatedly formed on the first upper surface along a first direction and a second direction substantially perpendicular to the first direction. Each of the first light-concentrating protrusions 312 on the first upper surface of the base film 311 has a width of a first pitch P1. The first pitch P1 is defined as an interval between an outer edge of the first surface of the protrusion 312 and an outer edge of the second surface of the protrusion 312 along the first upper surface of the first base film 311.

In exemplary embodiments, a plurality of fixed diffusion beads (not shown) may be disposed at a first lower surface of the first base film 311 opposite to the first upper surface of the first base film 311. Alternatively, the diffusion beads may be dispersed in the first base film 311, so that the first optical sheet 310 diffuses and concentrates light generated by the light source 301.

The second optical sheet 330 is disposed above the first optical sheet 310 and concentrates light emitted from the first optical sheet 310. The second optical sheet 330 includes a second base film 331 and a plurality of second light-concentrating protrusions 332. The second optical sheet 330 is substantially the same as the first optical sheet 310 except for a size of each of the second light-concentrating protrusions 332.

Thus, the second light-concentrating protrusions 332 are protruded from a second upper surface of the second base film 331. The second light-concentrating protrusions 332 are repeatedly formed along the first and second directions. Each of the second light-concentrating protrusions 332 includes fifth, sixth, seventh, and eighth surfaces.

Similar to the surfaces in FIGS. 1-3, the fifth, sixth, seventh, and eighth surfaces, respectively, have a curvature substantially corresponding to an exterior surface of a cylinder. In one exemplary embodiment, the fifth surface is extended from the upper surface of the second base film 331 along an exterior surface of a third cylinder in a clockwise direction. The third cylinder has a third central axis substantially parallel to the second direction. The third central axis is a central line of the third cylinder on the second upper surface of the second base film 331. The sixth surface opposite to the fifth surface is extended from the second upper surface of the second base film 331 along the exterior surface of the third cylinder in a counterclockwise direction.

The seventh surface, which connects the fifth surface with the sixth surface, is extended from the second upper surface of the second base film 331 along an exterior surface of a fourth cylinder in a clockwise direction. The fourth cylinder has a fourth central axis, which is a central line of the fourth cylinder on the second upper surface of the second base film 331, substantially perpendicular to the third central axis. The eighth surface opposite to the seventh surface is extended from the second upper surface of the second base film 331 along the exterior surface of the fourth cylinder in a counterclockwise direction. The seventh and eighth surfaces connect the fifth surface with the sixth surface.

As illustrated in FIG. 11, each of the second light-concentrating protrusions 332 has a width of a second pitch P2. The second pitch P2 is defined as an interval between an outer edge of the fifth surface and an outer edge of the sixth surface on the second upper surface of the second base film 331. The second pitch P2 is smaller than the first pitch P1. In one exemplary embodiment, the first pitch P1 is about 1.5 to about 6 times larger than the second pitch P2.

The backlight assembly 300 further includes a reflecting sheet 305. The reflecting sheet 305 is disposed under the light source 301 and reflects light generated by the light source 301 toward the first optical sheet 310.

Figure 12:
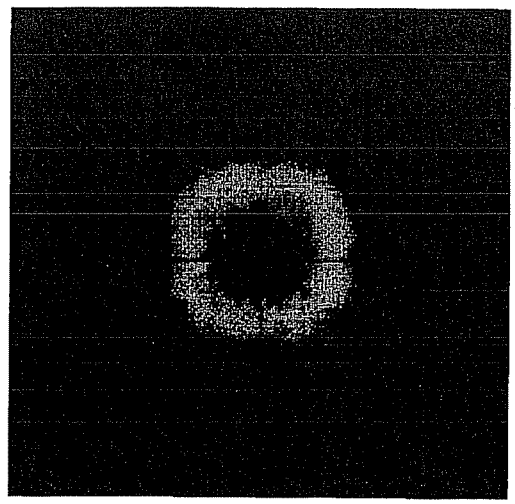
FIG. 12 is a view showing light-concentrating efficiency when the backlight assembly shown in FIG. 11 is used.

FIG. 12 is view showing light-concentrating efficiency when the backlight assembly shown in FIG. 11 is applied to an LCD apparatus.

Referring to FIGS. 11 and 12, the first optical sheet 310 diffuses and concentrates light generated by the light source 301. The second optical sheet 330 diffuses and concentrates light emitted from the first optical sheet 310.

As shown in FIG. 12 and described in FIGS. 9 and 10, the viewing angle is in a range of about −31 degrees to +31 degrees. Light is uniformly concentrated in the first and second directions.

In an exemplary embodiment, the first and second optical sheets 310 and 330 may be replaced by the optical sheet 110 shown in FIGS. 4A to 6. In this case, the first pitch P1 is larger than the second pitch P2.

A third pitch is defined as an interval between outer edges of the third and fourth surfaces on the first upper surface of the first base film 311. A fourth pitch is defined as an interval between outer edges of the seventh and eighth surfaces on the second upper surface of the second base film 331. The third pitch is larger than the fourth pitch. In one exemplary embodiment, the third pitch is about 1.5 to about 6 times larger than the fourth pitch.

Figure 13:
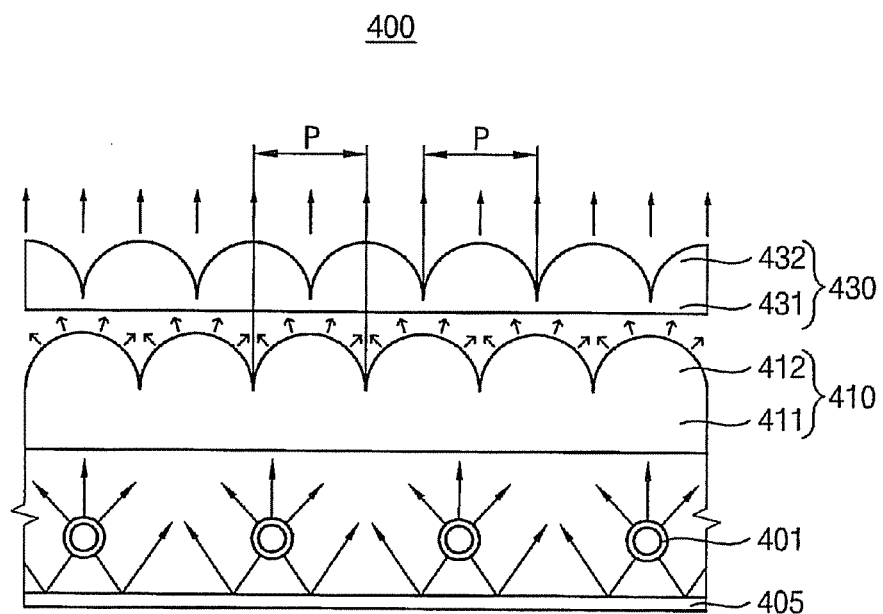
FIG. 13 is a cross-sectional view illustrating another exemplary embodiment of a backlight assembly according to the present invention.

FIG. 13 is a cross-sectional view illustrating another exemplary embodiment of a backlight assembly according to the present invention.

Referring to FIG. 13, a backlight assembly 400 includes a light source 401, a third optical sheet 410, a fourth optical sheet 430 and a reflecting sheet 405. The third and fourth optical sheets 410 and 430 are substantially the same as the optical sheet 10 shown in FIGS. 1 to 3.

The backlight assembly 400 is substantially the same as the backlight assembly 300 shown in FIG. 11 except for a pitch P of each of a plurality of third light-concentrating protrusions 412 formed in the third optical sheet 410, and a pitch P of each of a plurality of fourth light-concentrating protrusions 432 formed in the fourth optical sheet 430. Pitch P is substantially the same for both the third light-concentrating protrusions 412 and the fourth light-concentrating protrusions 432.

It may be difficult for the fourth optical sheet 430 to be disposed on the third optical sheet 410 such that each of the fourth light-concentrating protrusions 432 coincides in location and/or position with each of the third light-concentrating protrusions 412. Thus, the fourth optical sheet 430 may be disposed on the third optical sheet 410 such that each of the fourth light-concentrating protrusions 432 and each of the third light-concentrating protrusions 412 are alternately disposed relative to each other as shown in FIG. 12.

Figure 14:
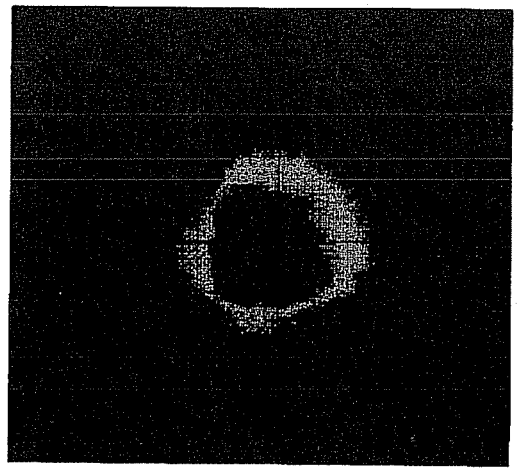
FIGS. 14 and 15 are views showing light-concentrating efficiency when the backlight assembly shown in FIG. 13 is applied.
Figure 15:
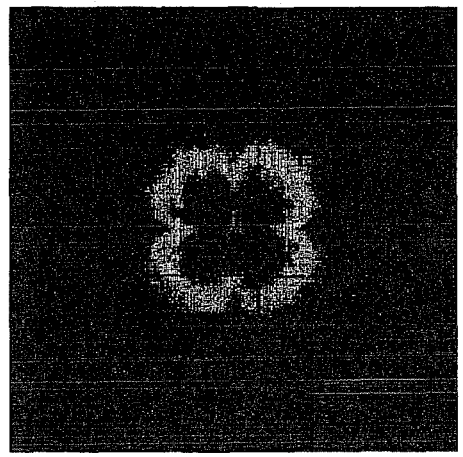

FIGS. 14 and 15 are views showing light-concentrating efficiency when the backlight assembly shown in FIG. 13 is applied to an LCD apparatus. FIG. 14 shows an observation result when each of the third light-concentrating protrusions 412 is deviated from each of the fourth light-concentrating protrusions 432 by about ¼ of the pitch P. FIG. 15 shows an observation result when each of the third light-concentrating protrusions 412 is deviated from each of the fourth light-concentrating protrusions 432 by about ½ of the pitch P.

A moiré pattern appears when light-concentrating protrusions having substantially the same pitch are stacked with each other. Interference fringes appearing when periodic wave protrusions overlap each other appear on the fourth optical sheet 430 because of a moiré pattern.

Referring to FIG. 14, light-concentrating efficiency is lowered since light is not concentrated in a row direction and a column direction. Referring to FIG. 15, light is concentrated in a direction of a diagonal line.

Referring again to FIGS. 11 and 12, the first pitch P1 of each of the first light-concentrating protrusions 312 is about 1.5 to about 6 times larger than the second pitch P2 of each of the second light-concentrating protrusions 332 in the backlight assembly 300. Thus, a moiré pattern may not appear even though the first and second light-concentrating protrusions 312 and 332 are deviated from each other.

Therefore, light-concentrating efficiency of the backlight assembly 300 is larger than that of a conventional backlight assembly having a diffusion sheet and two prism sheets.

Figure 16:
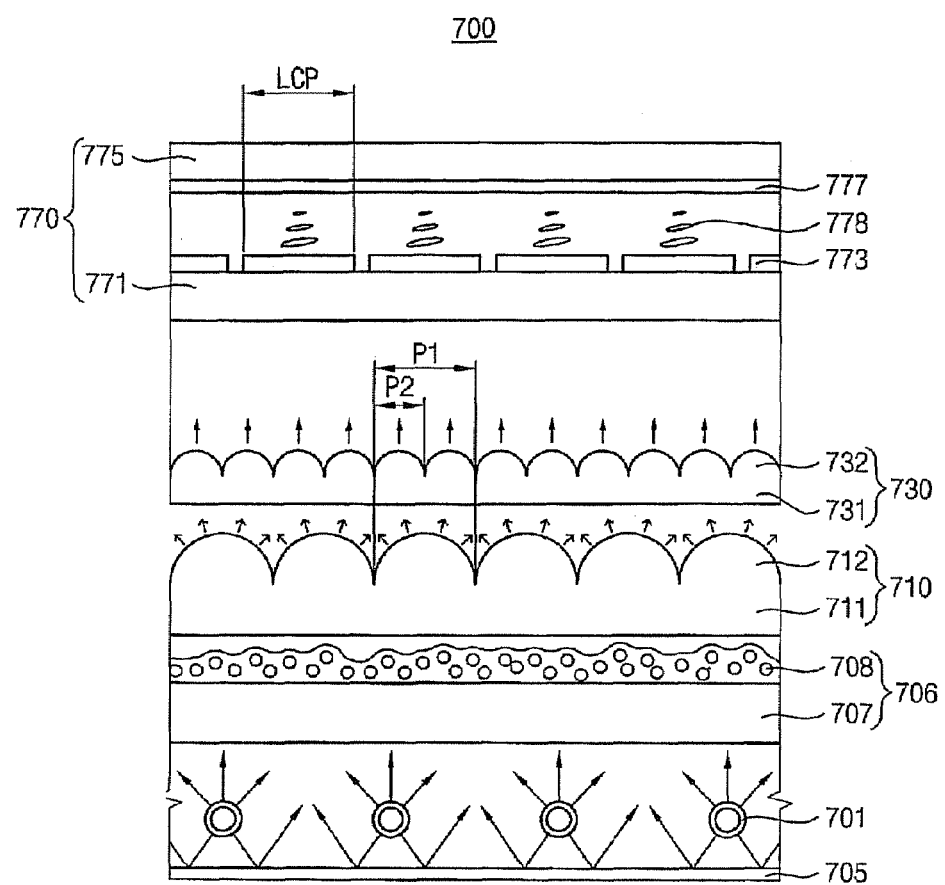
FIG. 16 is a cross-sectional view illustrating an exemplary embodiment of a liquid crystal display ("LCD") apparatus according to the present invention.

FIG. 16 is a cross-sectional view illustrating an exemplary embodiment of an LCD apparatus according to the present invention.

Referring to FIG. 16, an LCD apparatus 700 includes a light source 701, a first optical sheet 710, a second optical sheet 730, a reflecting sheet 705 and an LCD panel 770. The light source 701, the first optical sheet 710, the second optical sheet 730 and the reflecting sheet 705 are substantially the same as the light source 301, the first optical sheet 310, the second optical sheet 330 and the reflecting sheet 305 shown in FIGS. 11 and 12, respectively.

The first optical sheet 710 includes a first base film 711 disposed above the light source 701 and a plurality of first light-concentrating protrusions 712. Each of the first light-concentrating protrusions 712 is protruded from an upper surface of the first base film 711 and has a width of first pitch P1.

The second optical sheet 730 includes a second base film 731 and a plurality of second light-concentrating protrusions 732. Each of the second light-concentrating protrusions 732 is disposed above the first optical sheet 710. Each of the second light-concentrating protrusions 732 is protruded from an upper surface of the second base film 731 and has a width of a second pitch P2 that is smaller than the first pitch P1.

The LCD apparatus 700 further includes a diffusion sheet 706. The diffusion sheet 706 diffuses light generated by the light source 701. The diffusion sheet 706 is disposed between the light source 701 and the first optical sheet 710. The diffusion sheet 706 includes a base film 707 and a plurality of diffusion beads 708 fixed on the base film 707.

The LCD panel 770 displays images by using light generated by the light source 701 and passing through the first and second optical sheets 710 and 730, respectively. The LCD panel 770 includes a first substrate 771, a second substrate 775 opposite to the first substrate 771 and a liquid crystal layer inserted between the first and the second substrates 771 and 775.

The first substrate 771 includes a plurality of pixels 773 arranged substantially in a matrix shape. The pixel 773 includes a pixel electrode (not shown) formed of a transparent conductive material. The second substrate 775 includes a common electrode 777 facing the pixel electrodes. When an electric field between the pixel electrodes and the common electrodes 777 changes the arrangement of liquid crystal molecules 778, variation of the arrangement of the liquid crystal molecules 778 controls the amount of light passing through the liquid crystal layer. Therefore, the LCD apparatus 700 displays the images in the LCD panel 770.

If a pitch of a pixel LCP, which is considered as a width of the pixel in the same direction as the width P1 and P2, is substantially the same or similar to the first pitch P1 of each of the first light-concentrating protrusions 712 and the second pitch P2 of each of the second light-concentrating protrusions, a moiré pattern may appear as described in FIGS. 13 to 15. Therefore, display quality may be lowered.

In an exemplary embodiment, the pitch of a pixel LCP may be larger or smaller than each of the first pitch P1 and/or the second pitch P2. In one exemplary embodiment, the pitch of the pixel is different from the second pitch P2 of each of the second light-concentrating protrusions 732, which are closer to the LCD panel 770 than the first light-concentrating protrusions 712.

As in the illustrated exemplary embodiments, the light-concentrating protrusions formed in the optical sheet concentrate light in a row direction and a column direction. Thus, two optical sheets as in the illustrated embodiments may replace a conventional diffusion sheet and two conventional prism sheets.

Also, as in the illustrated exemplary embodiments, a predetermined light-concentrating efficiency corresponding to a row direction and a column direction may be acquired according to shapes of the light-concentrating protrusion. The optical sheet of the illustrated embodiments may be selected according to the required level of display quality of the display device. A moiré pattern may be reduced or effectively prevented when optical sheets having different pitches are applied to an LCD apparatus. Advantageously, the display quality of the LCD apparatus may be enhanced.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. An optical sheet comprising:
   a base film; and
   a light-concentrating member including a plurality of light-concentrating protrusions disposed on an upper surface of the base film, each of the light-concentrating protrusions including:
   a first surface curvedly extended from the upper surface of the base film about a first central axis disposed substantially parallel to a first direction along the upper surface;
   a second surface substantially facing the first surface, and curvedly extended from the upper surface of the base film about a second central axis substantially parallel to the first central axis; and
   a third surface, which connects the first surface with the second surface, curvedly extended from the upper surface of the base film about a third central axis substantially perpendicular to the first and second central axes, the third surface convexly connected with both the first surface and the second surface; and
   a fourth surface substantially facing the third surface, and curvedly extended from the upper surface of the base film about a fourth central axis substantially parallel to the third central axis, the fourth surface connecting the first surface with the second surface, and the fourth surface convexly connected with both the first surface and the second surface
   wherein the first, second, third, and fourth surfaces respectively have a substantially triangular shape and have a common point.

2. The optical sheet of claim 1, wherein the light-concentrating protrusions are repeatedly formed on the upper surface of the base film along the first direction, and a second direction substantially perpendicular to the first direction and substantially parallel to the third central axis.

3. The optical sheet of claim 1, wherein the first central axis is substantially identical to the second central axis, and wherein the third central axis is substantially identical to the fourth central axis.

4. A backlight assembly comprising:
   a light source generating light;
   a first optical sheet including a first base film disposed above the light source and a first light-concentrating member having a plurality of first light-concentrating protrusions formed on an first upper surface of the first base film, each of the first light-concentrating protrusions on the first upper surface including at least four curved surfaces protruding from the first upper surface of the first base film, and having a width of a first pitch, wherein the four curved surfaces of the first optical sheet are convexly connected to each other, respectively, and have a substantially triangular shape and a common point;

a second optical sheet including a second base film disposed on the first optical sheet and a second light-concentrating member having a plurality of second light-concentrating protrusions formed on a second upper surface of the second base film, each of the second light-concentrating protrusions including at least four curved surfaces protruding from the second upper surface of the second base film, and having a width of a second pitch that is smaller than the first pitch, wherein the four curved surfaces of the second optical sheet are convexly connected to each other, respectively, and have a substantially triangular shape and a common point.

5. The backlight assembly of claim 4, wherein each of the first light-concentrating protrusions comprises:

a first surface curvedly extended from the first upper surface of the first base film about a first central axis;

a second surface substantially facing the first surface, the second surface curvedly extended from the first upper surface of the first base film about the first central axis;

a third surface, which connects the first surface with the second surface, curvedly extended from the first upper surface of the first base film about a second central axis substantially perpendicular to the first central axis; and a fourth surface substantially facing the third surface, the fourth surface curvedly extended from the first upper surface of the first base film about the second central axis, and connecting the first surface with the second surface.

6. The backlight assembly of claim 5, wherein each of the second light-concentrating protrusions comprises:

a fifth surface curvedly extended from the second upper surface of the second base film about a third central axis substantially parallel to the first central axis;

a sixth surface substantially facing the fifth surface, curvedly extended from the second upper surface of the second base film about the third central axis;

a seventh surface, which connects the fifth surface with the sixth surface, curvedly extended from the second upper surface of the second base film about a fourth central axis substantially perpendicular to the third central axis; and an eighth surface substantially facing the seventh surface, curvedly extended from the second upper surface of the second base film about the fourth central axis, the eighth surface connecting the fifth surface with the sixth surface.

7. The backlight assembly of claim 6, wherein the first pitch is defined by an interval between the first and second surfaces on the first upper surface, and the second pitch is defined by an interval between the fifth and sixth surfaces on the second upper surface.

8. The backlight assembly of claim 7, wherein the first pitch is about 1.5 to about 6 times larger than the second pitch.

9. The backlight assembly of claim 7, wherein a third pitch defined by an interval between the third and fourth surfaces on the second upper surface is larger than a fourth pitch defined by an interval between the seventh and eighth surfaces on the second upper surface.

10. The backlight assembly of claim 9, wherein the third pitch is about 1.5 to about 6 times larger than the fourth pitch.

11. A display apparatus comprising:

a light source generating light;

a first optical sheet including a first base film disposed above the light source and a first light-concentrating member having a plurality of first light-concentrating protrusions formed on an first upper surface of the first base film, each of the first light-concentrating protrusions on the first upper surface including at least four curved surfaces protruding from the first upper surface of the first base film, and having a width of a first pitch, wherein the four curved surfaces of the first optical sheet are convexly connected to each other, respectively, and have a substantially triangular shape and a common point; and a second optical sheet including a second base film disposed above the first optical sheet and a second light-concentrating member having a plurality of second light-concentrating protrusions formed on an second upper surface of the second base film, each of the second light-concentrating protrusions including at least four curved surfaces protruding from the second upper surface of the second base film, and having a width of a second pitch that is smaller than the first pitch, wherein the four curved surfaces of the second optical sheet are convexly connected to each other, respectively, and have a substantially triangular shape and a common point; and a display panel displaying images and disposed above the second optical sheet.

12. The display apparatus of claim 11, wherein a pitch of a pixel formed on the display panel is larger than both the first pitch and the second pitch.

13. The display apparatus of claim 12, further comprising a diffusion sheet diffusing light, the diffusion sheet being disposed between the light source and the first optical sheet.

14. The display apparatus of claim 11, wherein a pitch of a pixel formed on the display panel is smaller than both the first pitch and the second pitch.

15. The display apparatus of claim 14, further comprising a diffusion sheet diffusing light, the diffusion sheet being disposed between the light source and the first optical sheet.

16. An optical sheet comprising:

a base film; and a light-concentrating member including a plurality of light-concentrating protrusions disposed on an upper surface of the base film, each of the light-concentrating protrusions including:

a first surface curvedly extended from the upper surface of the base film about a first central axis disposed substantially parallel to a first direction along the upper surface;

a second surface substantially facing the first surface, and curvedly extended from the upper surface of the base film about a second central axis substantially parallel to the first central axis; and a third surface, which connects the first surface with the second surface, curvedly extended from the upper surface of the base film about a third central axis substantially perpendicular to the first and second central axes, the third surface convexly connected with both the first surface and the second surface; and a fourth surface substantially facing the third surface, and curvedly extended from the upper surface of the base film about a fourth central axis substantially parallel to the third central axis, the fourth surface connecting the first surface with the second surface, and the fourth surface convexly-connected with both the first surface and the second surface, wherein the first and second surfaces respectively have a substantially semicircular shape, and wherein the third and fourth surfaces respectively have a substantially trapezoidal shape and have a common edge.

* * * * *